Dec. 1, 1942.  E. ROSENTHAL  2,303,391
ELECTRIC CONDENSER AGGREGATE
Filed April 4, 1939  2 Sheets-Sheet 1
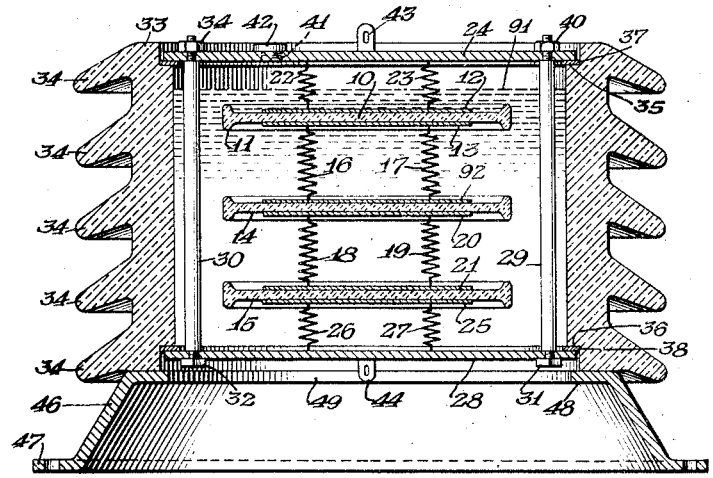
Fig. 1
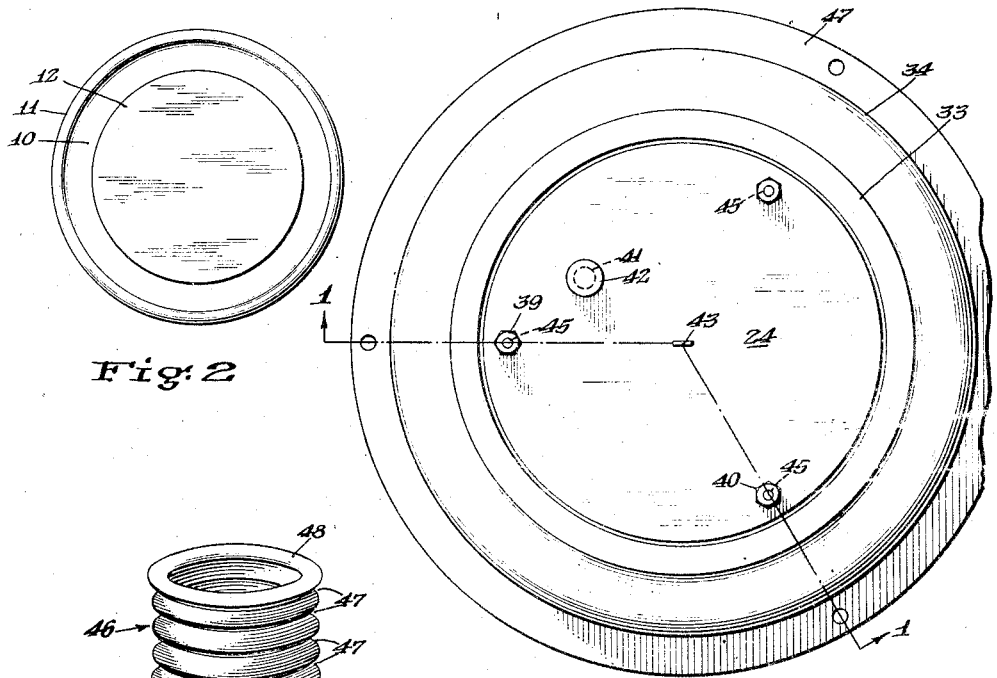
Fig. 2
Fig. 4
Fig. 3
INVENTOR.
Ernst Rosenthal
BY
ATTORNEY.

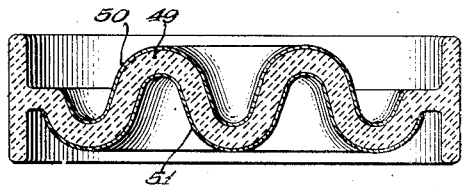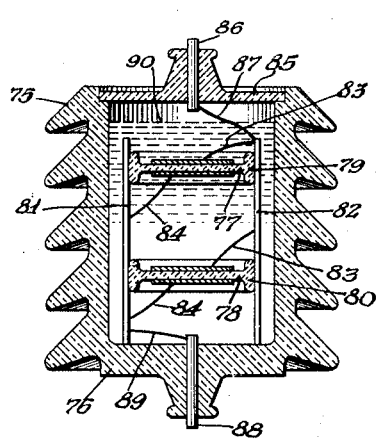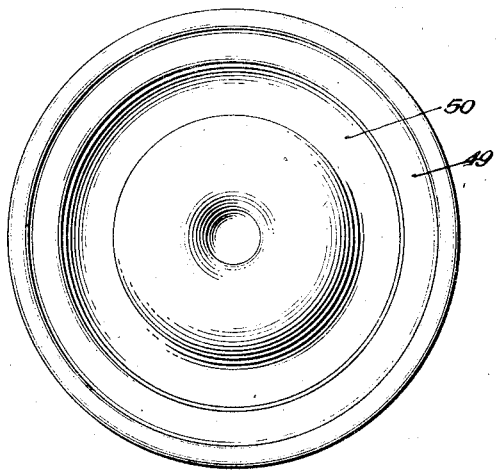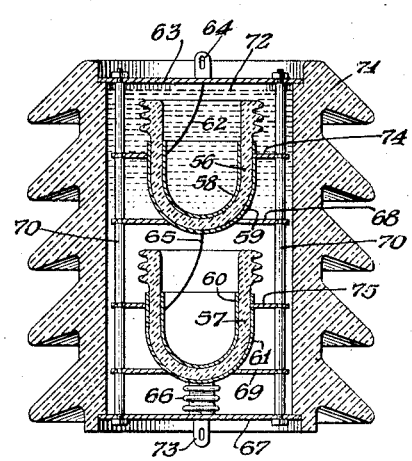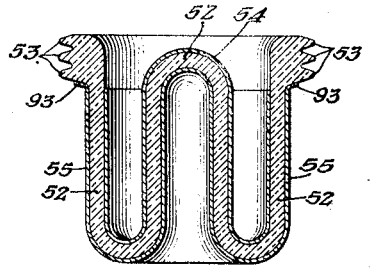

Patented Dec. 1, 1942

2,303,391

UNITED STATES PATENT OFFICE 2,303,391

ELECTRIC CONDENSER AGGREGATE

Ernst Rosenthal, London, England

Application April 4, 1939, Serial No. 265,888
In Great Britain July 7, 1938

7 Claims. (Cl. 175—41)

This invention relates to a condenser aggregate including ceramic condensers, particularly for high voltages and arranged in open air in connection with power lines.

Condenser aggregates of the type according to the invention can be used for many purposes, particularly as coupling condensers for high-frequency oscillations, such as modulated carrier waves for telegraph and telephone communication, signaling and television, and for power factor correction of high tension power lines.

It is an object of the invention to increase the efficiency of condensers of the type concerned, particularly when arranged in open air or indoors.

It is another object of the invention to reduce for a given capacity and voltage the space required for a condenser of the type concerned.

It is a further object of the invention to protect the condenser in open air and indoors against break-down and puncture by voltage surges occurring for any reason in the high voltage or power line with which the condenser is associated.

It is still another object of the invention to provide a condenser for use in open air under all weather conditions which is not destroyed by flash-overs or punctures.

The invention also contemplates to provide a condenser for use in open air or indoors in which ceramics of high dielectric constant can be used substantially without a glaze.

The invention will be more clearly understood when the specification proceeds with reference to the drawings in which Fig. 1 shows a cross-section through an assembled condenser aggregate or unit, taken along the lines I—I in Fig. 3, Fig. 2 shows a plane view of a condenser element seen from below, as used in an aggregate according to Fig. 1, Fig. 3 shows a plane view of an aggregate as shown in Fig. 1, Fig. 4 shows a perspective view of a resilient member for conductively connecting two condenser elements inter se or a condenser element with an end plate, Fig. 5 shows a cross-section and Fig. 6 a plane-view of a modification of a condenser element provided with increased surface extension, Fig. 7 shows a cross-section through another modification of a condenser element, also provided with increased surface extension, Fig. 8 shows a cross-section through a condenser aggregate comprising pot-shaped condenser elements, and Fig. 9 a cross-section through still another modification of a condenser aggregate according to the invention.

It is to be understood that the invention is not limited to any of the exemplifications thereof but to be derived in its broadest aspect from the appended claims.

In the drawings, identical portions or parts are shown with identical reference numbers.

Referring to Fig. 1, the principle of the invention may be explained.

A ceramic condenser consists in this exemplification of a disc 10 of ceramic material which is provided with a rim or flange 11 protruding on both sides of plate 10 to a sufficient extent. Within the rim 11 and at suitable distance thereof electrodes such as conductive coatings 12, 13 are applied to the ceramic body. Thereby a condenser element is obtained consisting of a ceramic body as dielectric and electrodes 12, 13 applied thereto in any convenient manner. If the voltage of the line with which the condenser element is to be associated exceeds the one for which an element of this type can efficiently or economically be made, then any desired number of those elements can be arranged in series and/or in parallel. In the drawings, two additional elements 14, 15 of a structure substantially identical with the element just described are shown in series-connection.

Preferably resilient electrical connecting members 16, 17 of any desired number and structure are provided between electrode 13 of the first element and electrode 92 of the next element, and in the same way connecting members 18, 19 are arranged between electrodes 20 and 21 of the elements 14 and 15, respectively. The uppermost electrode 12 is connected by similar electrical connecting members 22, 23 of any desired number with a preferably circular metal plate 24, and the lowermost electrode 25 is connected by any desired number of resilient conductors 26, 27 with a preferably circular metal plate 28. The plates 24 and 28 may consist, for instance, of iron or a well conducting alloy thereof.

Rods 29, 30 of any desired number and reduced in diameter as well as screw-threaded at both ends, are passed through holes of plates 24 and 28, respectively; nuts 31, 32 and 34, 40 are screwed onto those ends and press plates 24 and 28 into the abutting recesses 35, 36 of shell 33.

The rods 29, 30 consist of any suitable insulating material such as of wound paper impregnated by a highly insulating compound such as a condensation product of a phenol-formaldehyde basis. Any other suitable and sufficiently strong insulating material can be used.

A cylindrical and hollow insulating body or shell 33 of suitable ceramic material is provided on the outside with a number of ribs or flanges 34 and on the inside with circular recesses 35, 36. In the recesses packings 37, 38 are arranged. The plate 28 is inserted as a bottom in the recess 26 from below, and plate 24 is inserted as a cover in the recess 35 from above. Thereupon the screw-nuts 39, 40 are screwed unto the upper screw-threaded ends of the rods 29, 30 and thereby the assembly of the condenser aggregate is completed. Through hole 41 in plate 24 the air contained in the space of the container formed by the cover 24 and the bottom 28 and the shell 33 may be removed to any desired degree and a liquid or viscous insulating medium filled in the container up to the level 91, which is at sufficient distance above the upper level of rim 11 of the uppermost condenser element. Thereupon the hole 41 is closed by a screwed-in stopper 42 or the like. Terminals 43, 44 are connected outside to the plates 24, and 28, respectively.

Fig. 2 shows the condenser element 10 with rim 11 and electrode 13 from below. It is to be understood that the circular edge of electrode 12 is spaced from the circular rim 11 so far that no flash-over along the free surface of plate 10 and over rim 11 can occur under oil or any other insulating medium used both at normal operation and surge voltages.

Fig. 3 shows a plane-view of plate 24 provided with a terminal 43, hole 41 and stopper 42 therefor, and three holes 45 for receiving the upper ends of rods like those 29, 30 in Fig. 1. 34 is the upper rib or flange of the hollow insulating body 33.

The assembled condenser aggregate or unit can be put on a support 46, Fig. 1, of cylindrical shape having a lower flange 47 and an upper flange 48 on which the condenser rests, leaving a wide central hole 49 through which a conductor to the terminal 44 can be led. The condenser unit can also be hung on its top to a suitable support, and a lug shaped terminal 43, or other means (not shown) can be used to this effect.

It is obvious to anybody skilled in the art that a condenser element formed by a disc of ceramic material and provided with electrodes on its opposite surfaces, could be used in open air only for a voltage determined by the electric strength against puncture of the disc and the flash-over voltage between the edges of the electrodes over the rim of the disc. In open air and in rain, the upper surface of the disc and its rim would become wet and thereby conductive, and only the lower surface would serve to withstand the flash-over. Thereby either disc of extremely large diameter and large rims are required for sustaining a given voltage, or a number of such discs are to be arranged in series in order to subdivide the given voltage and thereby reduce the voltage for each element.

If, however, according to the invention an element is covered by oil or any other insulating medium, the entire surface of the free edge of the disc between the electrodes serves to resist the flash-over voltage independent of surrounding conditions. In addition thereto by the presence of a medium such as oil, which is of considerably larger electric resistance than air and particularly moist air, the flash-over voltage a single element can sustain is considerably increased.

Instead of a liquid or viscous insulating medium, a non-conductive gas preferably under elevated pressure, or even dry air under high pressure can be used. In such cases as well as if oil is used, it might be advisable to connect with the hole 41 a well known expansion vessel into which vapors or gas can enter in case a puncture through oil occurs in operation.

Ceramic materials of the type heretofore used for condensers have somewhat rough outer surfaces whereby the accumulation of dust, soot and like deposits is facilitated and the insulation against flash-overs is considerably reduced. Therefore, a glaze has to be applied to such ceramic bodies whereby the surface is smoothed and the accumulation of dust etc. prevented or washing off by rain facilitated. Such glazes can easily be applied to porcelain which has however a relatively low dielectric constant. If ceramics of higher dielectric constant are used, which comprise materials such as titanium oxide, magnesia and/or zirconia, it is difficult if possible at all, to apply a permanently adhering glaze.

With the present invention, these difficulties are overcome. It does not matter any more whether the surface of the ceramic body is somewhat rough, for the oil covering the condenser body prevents any deposits of dust and soot and secures a constant insulation against flash-overs, independent of weather and other conditions of the surroundings. Therefore, for a desired capacity and a given dielectric constant of the ceramic used, the thickness of the disc has to be determined and its diameter can be kept so small that just the space required for the electrodes to give the desired capacity, and a free flanged edge of the desired flash-over resistance under oil or the medium used, is obtained. Such disc is considerably smaller than required in open air. From this it appears that with the invention the smallest possible ceramic bodies can be used for a condenser element of desired capacity and for a given flash-over and puncture voltage. No glaze is necessary and therefore ceramic materials of high dielectric constant as referred to above can be successfully applied. Taking into consideration that bodies of the latter type are considerably more expensive than those of porcelain, it appears that the reduction of the amount of material to be used for making a condenser element according to the invention is of decisive value.

The ceramic discs are of such a size, that with the use of as little ceramic material as possible, the largest possible capacity is obtained, and they are constructed and connected in such manner, that they will fit into a container which possesses the most favorable size and form, having regard to the service voltage and conditions prevailing. To give an example, if a condenser is designed for 100,000 volts, the arc-over voltage of the condenser has to be 300,000 volts. This has to be the dry flash-over voltage, if the condenser is designed for use indoors, but the wet flash-over voltage must be 300,000 volts if the condenser is designed for use in the open air. Taking, for example, the design of a 100,000 volt condenser, for use out of doors. If five condenser plates are used in series the tension allocated to each of the five plates would be 60 kv. Thus each of the plates should have a flange in both directions, up and down, of at least 50 cms. Large discs with such immense flanges cannot be properly produced, and consequently, it would be necessary either to use plates of a smaller diameter, as a result of which the capacity would be reduced and a greater number of such condenser aggregates would have to be connected in parallel, to produce the same capacity. Or else one would have to choose the alternative method of connecting more plates than five, for instance ten, in series, so that the flanges would only have to be dimensioned for a flash-over tension of 30,000 volts, but this connection in series of more plates would give a resulting capacity of only half that of five discs, so that again several condenser aggregates would have to be connected in parallel.

But if the plates are immersed in oil, the insulating qualities of the oil come into play, and the flanges will only have to be one third approximately of the size necessary if the plates are designed for use in air.

Furthermore, with the flanges arranged at right angles to the plates, upwards and downwards, a kind of trough is formed. There is practically no other possibility of arranging the flanges, but this has the great disadvantage that in the case of use out-of-doors, rainwater will collect in these troughs and when used indoors, condensed water will collect. With the condensers arranged with their axes in a horizontal direction, the same disadvantages will arise to a lesser degree and it can only be completely avoided by giving the flanges a form which would be electrically unfavorable, and more expensive.

Under oil the conditions are absolutely different, because the condenser need only have flanges which insulate the electrodes on the discs under oil, and they can therefore be much smaller. This enables the manufacturer to produce discs of much greater diameter, and as at the same time the height of the discs is much smaller, more flanged discs can be arranged in an aggregate of given height.

To obtain the greatest possible capacity, the diameter of the discs must be as large as possible, and the thickness of the plates as small as possible. The thinness of the plates is limited by the puncture strength of the ceramic material, and by the difficulties of manufacture. The production of thin plates is much facilitated if the flanges on the edges are made as small as possible.

It will also be appreciated that the means for withstanding a flash-over between the terminals 43 and 44 consists in the insulating body or shell 33 forming part of a container and provided with ribs or flanges 24 of any suitable and well known type. This body can conveniently be made of porcelain and provided with a glaze. It can be designed so that it gives the best resistance against any flash-over under all conditions of weather. It can be ribbed at the outside so as to form a plurality of spaced flanges whose planes are transverse to the axis of the container. The flanges will materially increase the length of the surface path between the terminal lead bushes, and the flash-over voltage can be made as high as may be desired by increasing the number and depth of the ribs or flanges. The designer need not consider the flash-over voltage of the container so as to give the requisite flash-over tension. From this it follows that this insulating body 33 can conveniently be made in the most effective as well as cheapest way according to experience had with ordinary open air or indoor insulators. Thus by the present invention the condenser elements can be designated from the viewpoint of highest electrical efficiency and capacity and the insulating body 33 can be designed solely from the viewpoint of offering the best flash-over insulation.

According to the present invention, the puncture voltage through oil or the like between the terminal 43 and 44 inside the container 24, 28, 33 is chosen so that it is considerably higher, e. g. 10% to 30% higher than the dry flash-over voltage between the plates 24 and 28 measured over the outer surface of the shell 33. Thereby it is made sure that in case of surges and other unforeseen increases of the voltage of the power line with which the condenser is associated, causing a flash-over, the latter will occur along the outside surface of shell 33 and not through the interior thereof. Thereby any damage to the valuable condenser elements placed inside the shell 33 is successfully prevented. It will be appreciated that there is a flash-over voltage through air over the outside of shell 33 either between the terminals 43 and 44 or the edges of plates 24 and 28 if they consist of metal and are in conductive connection with the terminals 43, 44 respectively. There is further a puncture voltage through body 33 between the edges of plates 24 and 28 if they consist of metal and are in electrical connection with the terminals 43, 44, respectively. There is further a puncture voltage through the interior of the container formed by shell 33 and the plates 24, 23 if the latter consist of metal, substantially through the insulating medium and the space, if any, above level 91, such puncture to occur through the cylindrical ring space between the circumference of the ceramic bodies 11, 14, 15 and the interior surface of shell 33. There is still another puncture voltage through the ceramic bodies 11, 14, 15, this puncture voltage equaling the total of the puncture voltages of the individual ceramic bodies between the electrodes applied to them which are in turn connected in series between the terminal 43 and 44. There is another flash-over voltage equaling the total of the individual flash-over voltages between a pair each of electrodes applied to a ceramic body through the insulating medium, such as oil, covering the free edges and ribs or flanges of the ceramic body. According to the invention it is preferred to make the first mentioned flash-over voltage over the outside of shell 33 smaller than the total puncture voltage through the ceramic bodies of the condenser elements as well as the total flash-over voltage over their free edges and ribs or flanges submerged in the insulating medium, thereby preventing any damage to the ceramic bodies and hence undesired interruptions of operation for replacing destroyed condenser elements or the insulating medium. Hence it follows that the puncture voltage through the interior of the container, substantially comprised of the insulating medium, should be larger than the flash-over voltage over the outside of shell 33. The total puncture voltage through the ceramic bodies of the condenser elements may approximately equal that of shell 33, or exceed it. It has been found safe for all practical purposes, however, that the total puncture voltage of the ceramic bodies is even smaller than that of shell 33, by about 10% to about 25% as an approximate maximum. It has been found surprisingly that oils with a certain small degree of conductivity are preferable to oils with the highest insulating properties. Such oils are for instance good transformer oils such as tar oils obtained from lignites; their use results in higher puncture values of the condenser discs or plates. Since the capacity increases with the decreasing thickness of the discs or plates, it is important to use oils giving the highest possible puncture strength to the discs or plates, although the use of oils of somewhat higher conductivity than that of normal insulating oils necessitates a slight increase of the height of the flanges of the discs or plates.

In practical use, terminal 43 may be connected e. g. with a power line and terminal 44 with a lead to a transmitter or receiver or conductor for high frequency waves or the like.

If the condenser aggregate according to the invention is to be used for power factor correction the terminals 43, 44 should be connected between two conductors of the power line or between a conductor and ground, as the case may be.

As a ceramic material for the conductor element any one known and suitable can be used, as mentioned above. If oxides of high electric constant are used, convenient mixtures thereof with a binding material is preferable; for instance 70% to 80% of titanium oxide may be mixed with a suitable plastic binder, such as clay, shaped and fired preferably at sintering temperatures. The simple shapes needed for the discs can easily be molded from such material, whereas the more complicated and large shape of the outside insulator 33 can be conveniently made of porcelain in well known processes, and provided with a glaze.

As resilient distance elements and electrical connections as indicated more schematically at 16, 17, 18, 19, 22, 23, 26 and 27 in Fig. 1, any suitable springy metallic body 46 of copper or like conductive material as shown in Fig. 4 provided with bellow folds 47 and wide flanges 48. The bellow folds provide resilience, and the flanges 48 a conveniently broad contact surface for transmitting the electric current. Such bodies keep the condenser elements in desired distance from each other and from the plates 24, 28.

The electrodes 12, 13 etc. may consist of any suitable material and be applied in any convenient manner. They may consist, for instance, of copper or an alloy thereof and be deposited on the designated places in any suitable way, such as by spreading on by means of a Schoop pistol. A glaze, if applied to the surface of the ceramic bodies, may be of any suitable insulating and at the places where electrodes are applied, even conductive type.

In order to increase the capacity of each condenser element, it may be given any desired shaped different from a flat disc, as shown by way of example in Figs. 5 and 6. 49 is a body of ceramic material having an enlarged surface covered in substantial part of electrodes 50, 51.

If a limited diameter is given for the aggregate, a condenser element having relatively large capacity can be obtained for instance by a shape as shown in Fig. 7. 52 is a ceramic body forming a rotation body provided with ribs 53 at its edge and the electrodes 54, 55. In view of the fact that the entire body is under oil or the like, relatively small ribs 53 can be used. It is advisable to draw the edge of electrode 55 at 93 over the groove formed by the lowest rib 53 in order to lessen the electrical strain on that rib.

In Fig. 8, pot-shaped condenser elements 56, 57 are used each provided with ribs at its edges and electrodes 58, 59 and 60, 61 respectively. 62 is the connecting lead with the upper metallic plate or cover 63 which is provided with a terminal 64. 65 is the connecting lead between the electrodes 59, 60, and 66 is a support and connection of the type as shown in Fig. 4 with the lower metallic end of plate or bottom 67 which is provided with a terminal 73. Each pot is supported e. g. by circular plates 68, 74 and 69, 95, respectively of insulating material, such as laminated paper impregnated with a condensation product of phenol and formaldehyde, and these plates are supported by a sufficient number of rods 70 corresponding to rods 29, 30, of Fig. 1. 71 is a hollow outside insulating body or shell forming part of a container filled with oil or the like to the level 72.

Many modifications of the examples given above are feasible without departing from the principles of the invention. Thus the lower metal plate 28 can be replaced by a plate of insulating material and a terminal passed through it. Such a plate of insulating material can also be made in one piece with the hollow insulating body 33. In the same way the upper metal plate 24 may be made of other material than metal, and a terminal be passed through it.

In Fig. 9 a container 75 with bottom 76 of porcelain is shown, the shell 75 being provided on the outside with ribs or flanges. Two disc-like condenser elements 77, 78 provided with electrodes at opposite sides and flanges 79, 80 are arranged within the container. Two flat bars or sheet 81, 82 of copper or like conductive material are cemented by means of an insulating cement to a part each of the cylindrical circumference of the flanges 79, 80 preferably on opposite sides thereof and rest on the inside of bottom 76. There-by the condenser elements are supported within the container. The upper electrodes of the condenser elements are connected with the bar 79 by means of conductors 83, and the lower electrodes are connected with the bar 81 by means of conductors 84. The cover 85 is made of insulating material such as porcelain or a laminated condensation product of a phenol-formaldehyde base, and passed by a terminal 86 which is connected by conductor 87 with the bar 82. The bottom 76 is passed by a terminal 88 and connected by conductor 89 with the rod 81. Thus the condenser elements 77, 78 are connected in parallel with the terminals 86, 88 within the container. The condenser elements are submerged in oil having a level 90.

In this case, the flange 79, 80 should be somewhat larger than in the feature shown in Fig. 1 in order to prevent flash-overs or punctures between the electrodes and the conductive bars of opposite voltage.

Instead of assembling the end plates and the condenser elements by means of rods passing through the interior of the hollow insulating body 33, separate means may be provided for supporting the condenser elements within the interior of the container on one hand and for connecting inter se the parts forming the container. Also, a separate container of insulating material may be provided in which the condenser elements are inserted and oil or a like medium filled in, and such container covered on its outside over a suitable length with a hollow shell of the type as exemplified in the drawings by body 33.

What I claim is:

1. A condenser aggregate, particularly for use as coupling condenser for high frequency oscillations and for power factor correction, comprising in combination a number, one as a minimum, of ceramic condenser elements, each element substantially consisting of a ceramic dielectric body provided with electrodes on opposite sides and means of the type as exemplified by ribs and flanges spaced from the edges of said electrodes to increase the flashover voltage between said edges, a container substantially consisting of an insulating shell provided on its outside with means for increasing its flashover voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flash-over voltage between said terminals being substantially smaller than the puncture voltage of said condenser elements between said terminals and the flash-over voltage along said condenser elements between said terminals substantially through said medium contained in said container.

2. A high-voltage condenser aggregate comprising in combination a number, one as a minimum, of ceramic condenser elements, each element substantially consisting of a disc-like body of ceramic dielectric material provided with electrodes on opposite sides and means of the type exemplified by ribs and flanges spaced from the edges of said electrodes to increase the flashover voltage between said edges, a container substantially consisting of a shell of porcelain provided on its outside with glazed means for increasing its flash-over voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flash-over voltage between said terminals being substantially smaller than the puncture voltage of said condenser elements between said terminals and the flash-over voltage along said condenser elements between said terminals substantially through said medium contained in said container.

3. A high-voltage condenser aggregate comprising in combination a number, one as a minimum, of ceramic condenser elements, each element substantially consisting of a pot-like body of ceramic dielectric material provided with electrodes on opposite sides and means of the type exemplified by ribs and flanges spaced from the edges of said electrodes to increase the flashover voltage between said edges, a container substantially consisting of a shell of porcelain provided outside with glazed means for increasing its flash-over voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flashover voltage between said terminals being substantially smaller than the puncture voltage of said condenser elements between said terminals and the flash-over voltage along said condenser elements between said terminals substantially through said medium contained in said container.

4. A high-voltage condenser aggregate comprising in combination a number, one as a minimum, of ceramic condenser elements, consisting of a substantially circular body of ceramic dielectric material shaped to form a number, one as a minimum, of co-axial grooves for increasing its surface extension, said body provided with electrodes on opposite sides and means of the type as exemplified by ribs and flanges spaced from the edges of said electrodes to increase the flash-over voltage between said edges, a container substantially consisting of an insulating shell provided on its outside with means for increasing its flashover voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flash-over voltage between said terminals being substantially smaller than the puncture voltage of said condenser elements between said terminals and the flash-over voltage along said condenser elements between said terminals substantially through said medium contained in said container.

5. A high-voltage condenser aggregate, comprising in combination a number, one as a minimum, of ceramic condenser elements, each element substantially consisting of a ceramic dielectric body provided with electrodes on opposite sides and means of the type as exemplified by ribs and flanges spaced from the edges of said electrodes to increase the flash-over voltage between said edges, a container substantially consisting of an insulating shell provided on its outside with means for increasing its flash-over voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a slightly electrically conductive oil of the type as exemplified by tar oil obtained from lignites substantially filling the space between said condenser elements and said container, the outside dry flash-over voltage between said terminals being substantially smaller than the puncture voltage of said condenser elements between said terminals and the flash-over voltage along said condenser elements between said terminals substantially through said medium contained in said container.

6. A condenser aggregate comprising in combination a number, one as a minimum, of ceramic condenser elements, each element substantially consisting of a body of ceramic composition having a higher dielectric constant than porcelain and exemplified by compositions containing substantial amounts of oxide compounds, including an oxide, of elements selected from a group consisting of titanium, zirconium and magnesium, said bodies provided with electrodes on opposite sides and means spaced from the edges of said electrodes for increasing the flash-over voltage between said edges, a container substantially consisting of a shell of insulating material provided on its outside with means for increasing the flash-over voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flash-over voltage between said terminals being substantially smaller than the puncture voltage of said condenser elements between said terminals and the flash-over voltage along said condenser elements between said terminals substantially through said medium contained in said container.

7. A condenser aggregate, particularly for use as coupling condenser for high frequency oscillations and for power factor correction, comprising in combination a number, one as a minimum, of ceramic condenser elements, each element substantially consisting of a ceramic dielectric body provided with electrodes on opposite sides and means of the type as exemplified by ribs and flanges spaced from the edges of said electrodes to increase the flash-over voltage between said edges, a container substantially consisting of an insulating shell provided on its outside with means for increasing its flash-over voltage, closed at its bottom and provided with a cover, at least one terminal each associated with said bottom and said cover and insulated from each other substantially by said shell, said condenser elements arranged within said container spaced from its inside surface, means for electrically connecting selected electrodes of said condenser elements with said terminals, and a medium of better insulating quality than open air and exemplified by oil substantially filling the space between said condenser elements and said container, the outside dry flash-over voltage between said terminals being substantially smaller than the puncture voltage between said terminals through the interior of said container.

ERNST ROSENTHAL.